W. E. KINNEAR.
Improvement in Harvester-Rakes.

No. 132,669. Patented Oct. 29, 1872.

Witnesses
Geo Bartle
J. C. Lyons

Inventor
William E. Kinnear
By his Atty
R. D. O. Smith

UNITED STATES PATENT OFFICE.

WILLIAM E. KINNEAR, OF BUCYRUS, OHIO.

IMPROVEMENT IN HARVESTER-RAKES.

Specification forming part of Letters Patent No. 132,669, dated October 29, 1872.

*To all whom it may concern:*

Be it known that I, WILLIAM E. KINNEAR, of Bucyrus, in the county of Crawford and State of Ohio, have invented a new and useful Improvement in Harvester-Rakes; and I do hereby declare the following to be a full, clear, and exact description of the same, reference being had to the accompanying drawing, in which—

Figure 1:
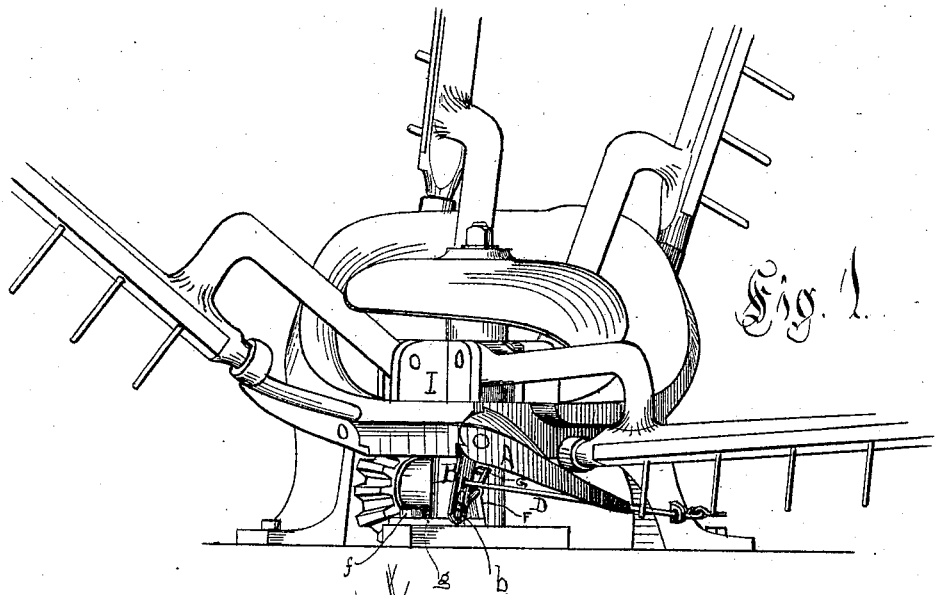
Figure 2:
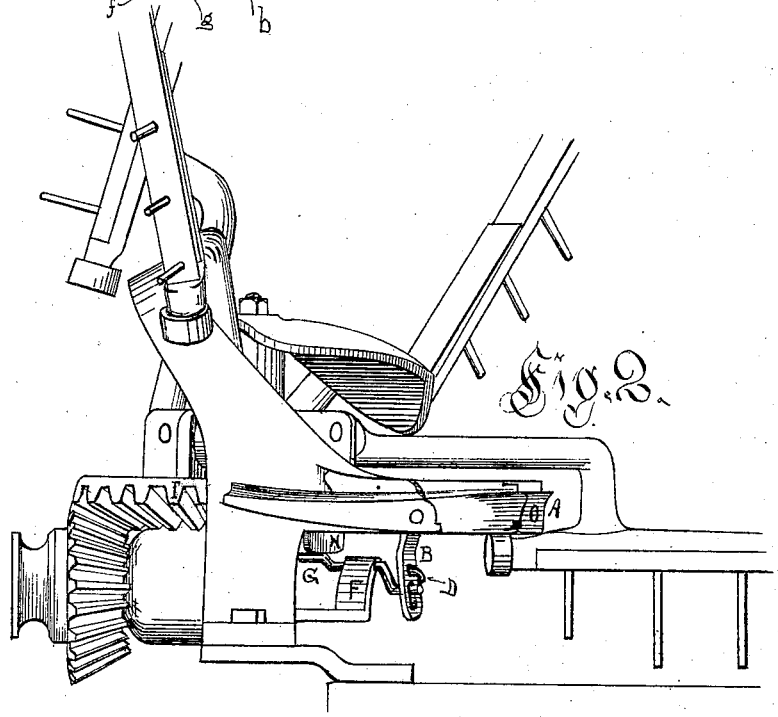
Figure 3:
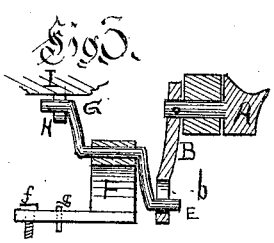

Figures 1 and 2 are side elevations of a Dodge and Perry rake with my improvements attached; and Fig. 3 is a vertical cross-section of the same.

This invention relates to that class of harvester-rakes known as revolving or reel rakes, wherein the reel-arms are jointed to a revolving head, and guided in their revolution by a stationary cam-guide having switch, whereby the beater which is designed to act as a rake may be permitted to leave said cam and descend upon the platform during the time when said beater is passing over the said platform to remove the grain therefrom; and it consists in an attachable and detachable device hereinafter described, whereby the switch devised by Dodge and Perry, and patented by them December 3, 1867, may be caused to work automatically, or at will, as desired by the attendant.

The general principle and construction of this rake will be understood by reference to the patent of Dodge and Perry above referred to, and therefore no detailed description of the same is required here.

That others may fully understand my invention, I will particularly describe the same.

The switch A is controlled and caused to close by the switch-lever B. In the machine of Dodge and Perry referred to this lever is operated, at the will of the attendant, only by means of the cord or wire D. I propose to elongate said lever downward sufficiently to receive a slot, *b*, to receive the crank E, and permit the same to have the requisite range of movement, as hereinafter described. The crank E is mounted at the upper end of the arm or standard F, which is bolted to the main frame at a convenient point. The shaft of the crank E turns in a box or bearing at the top of said standard, and the inner end of said shaft is bent to form a crank, G, reverse in position to the crank E, so that when the latter is in its lowest position the former is at its highest point. The standard F is secured to the main frame by a single bolt, *f*, and a steady-pin, *g*, so that it may be removed from the machine, when desirable, by reason of great unevenness of the standing grain. A cam, H, is secured to the under surface of the revolving head I, which carries the rake-arms in such position that at the proper moment in the revolution of said head said cam H will engage with the crank G and push the same over. This motion of crank G will cause the crank E to move in an opposite direction, carrying the lever B with it, and causing the switch A to close. The cam H is sufficiently long to cause the crank G to remain depressed, and the switch H to remain closed until the next succeeding rake-arm has passed below said switch, and the rake thereby permitted to engage with and remove the grain from the platform.

The automatic operation of the rake is highly desirable at all times, except when the grain stands very unevenly all over the field. The cord or wire D need never to be removed, and therefore, when working automatically, the rake may also be caused to work at the will of the attendant.

I am aware that revolving rakes have been heretofore constructed to work either automatically or at the will of the driver, and therefore I do not claim such result broadly, but only the means by which I have accomplished that result.

Having described my improvement, what I claim as new is—

In combination with the revolving head and the switch A, provided with the switch-lever B and operating cord or wire D, the cranks E G, journaled in the standard F and operating in the slot *b* and against the cam H, respectively.

In testimony that I claim the above to be my invention, witness my hand.

WILLIAM E. KINNEAR.

Attest:
WILLIAM HIGGINS,
G. L. MEYERS.